April 18, 1961   A. R. CUNNINGHAM   2,979,880
TEDDER AND WINDROW ATTACHMENT
Filed Oct. 25, 1957   7 Sheets-Sheet 2
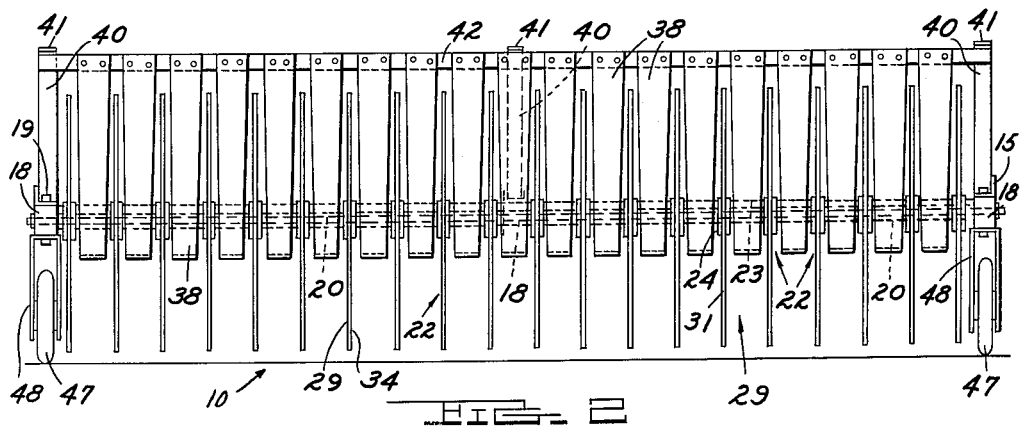
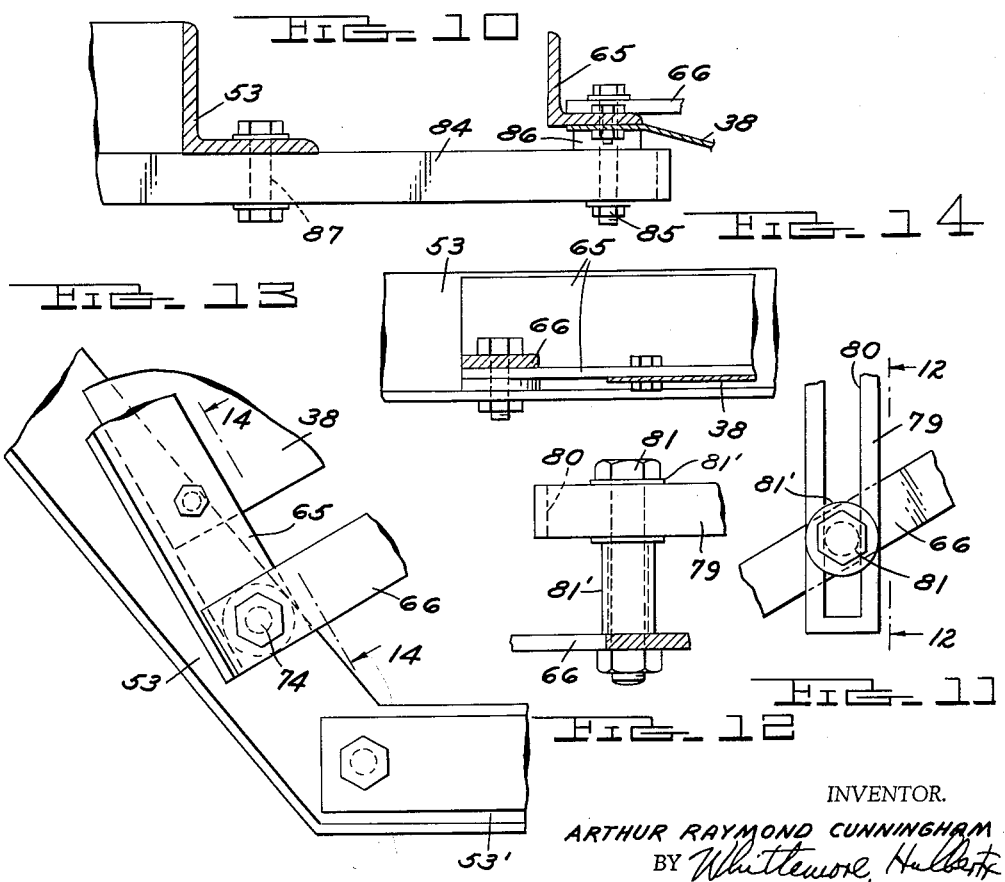
INVENTOR.
ARTHUR RAYMOND CUNNINGHAM
BY
ATTORNEYS

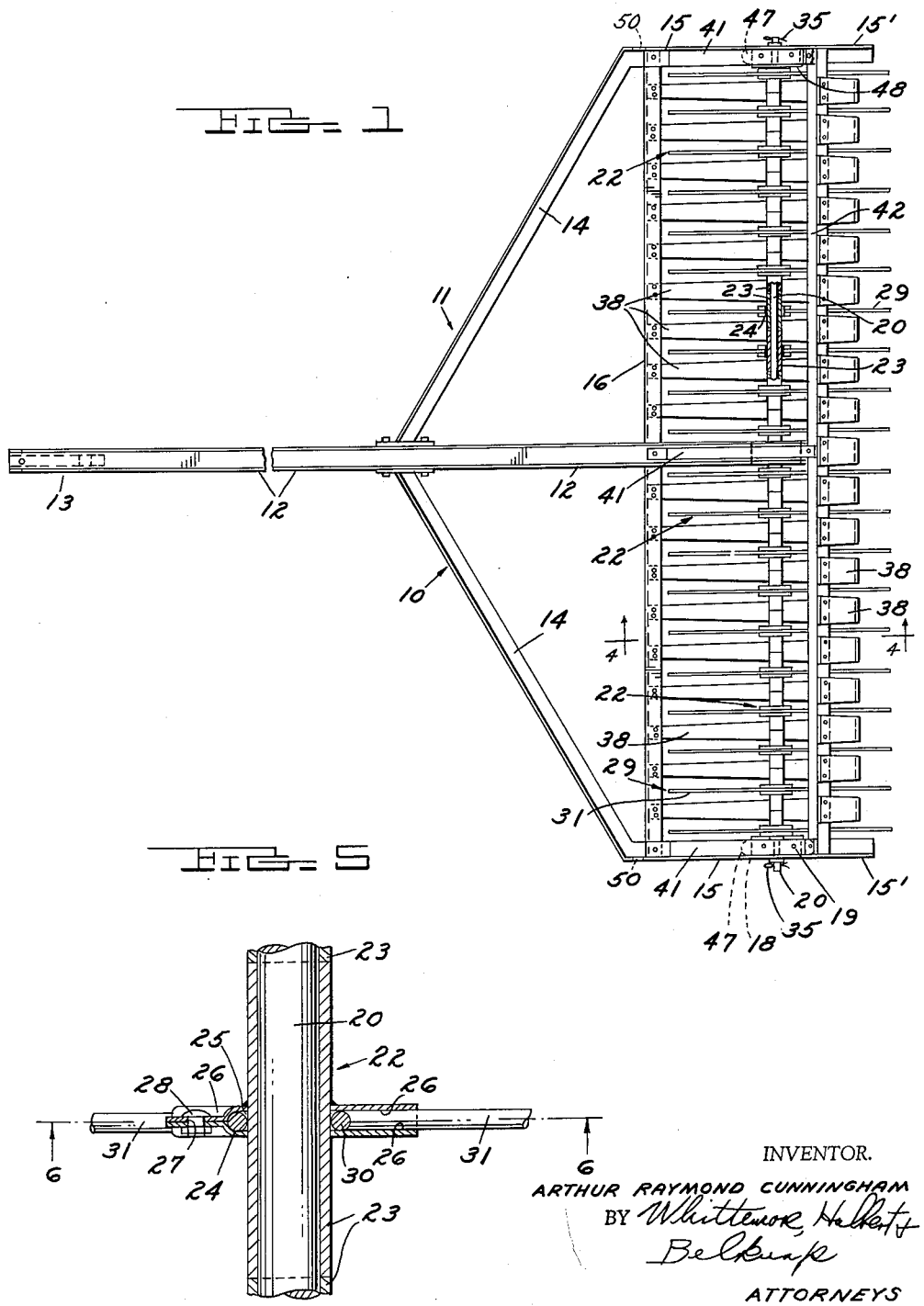

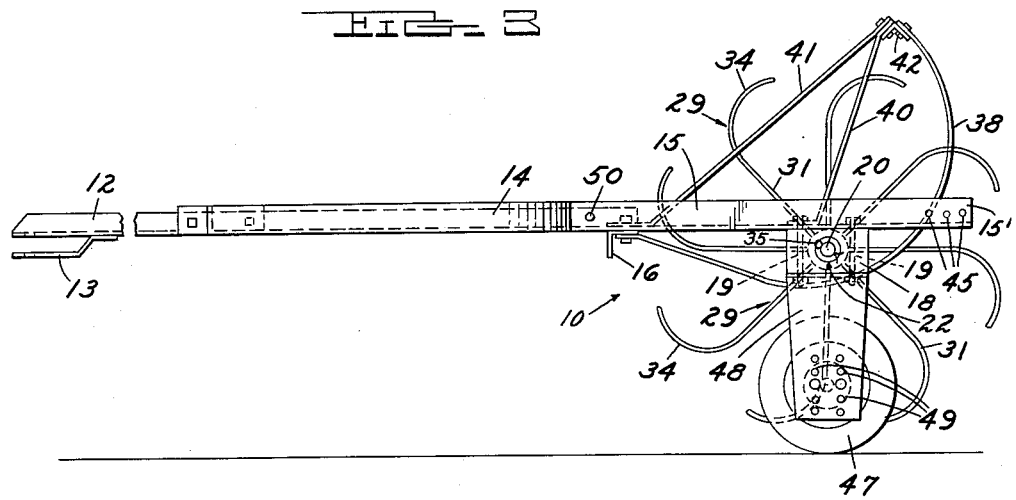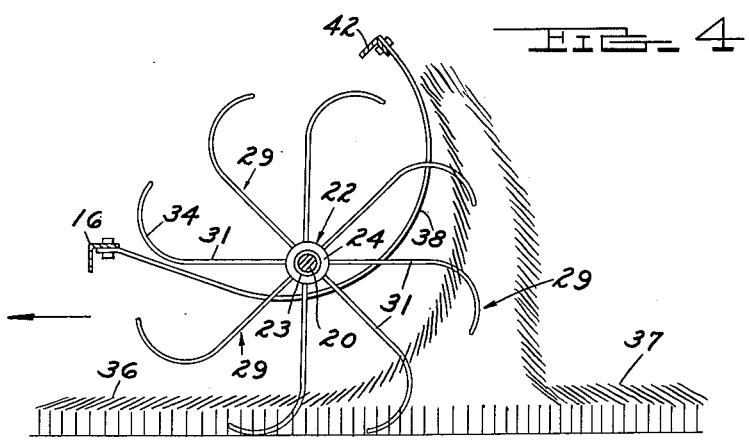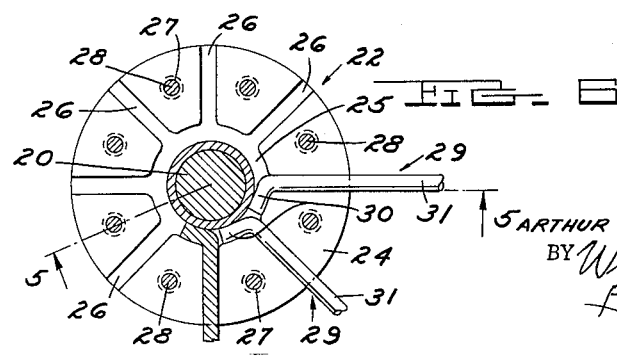

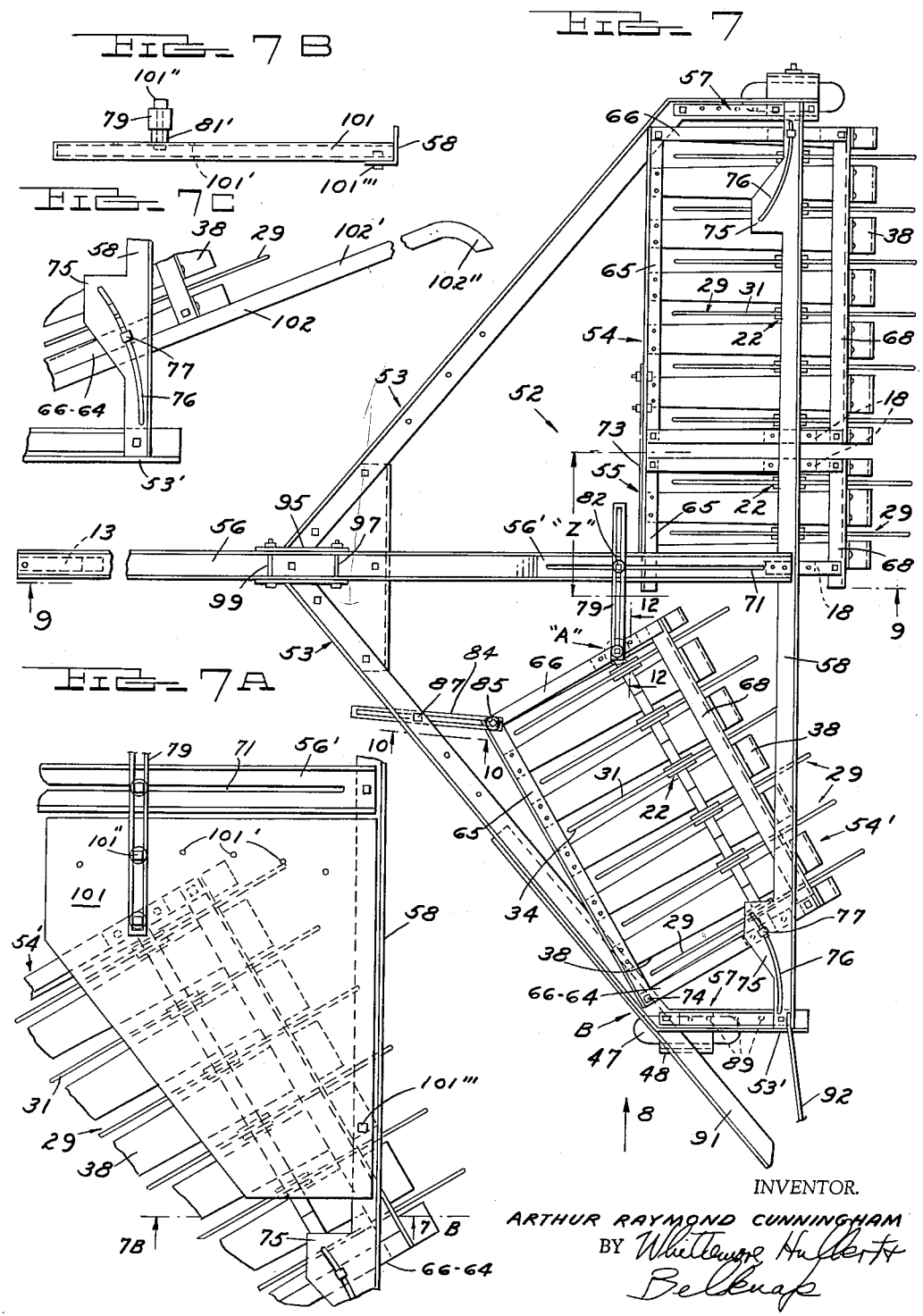

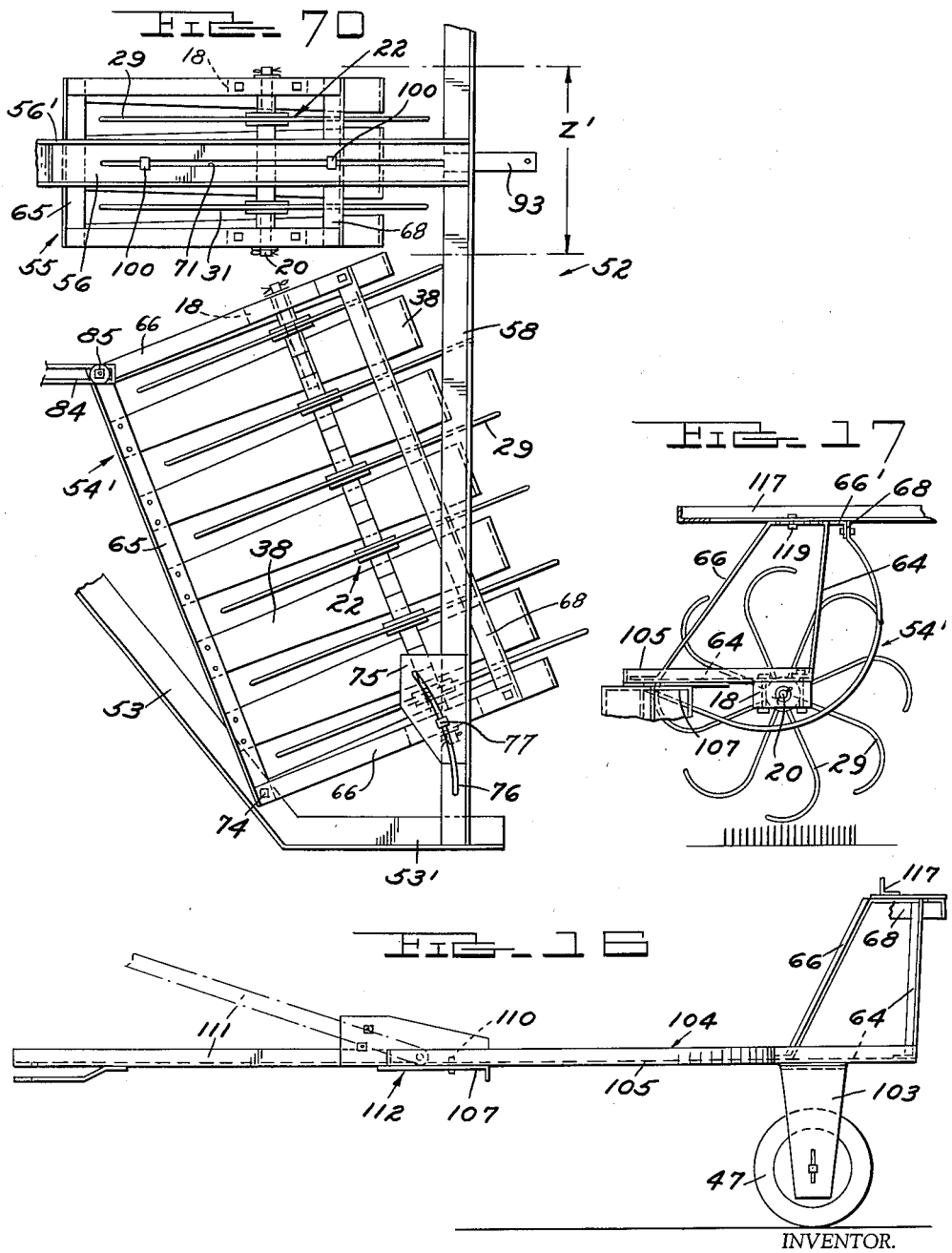

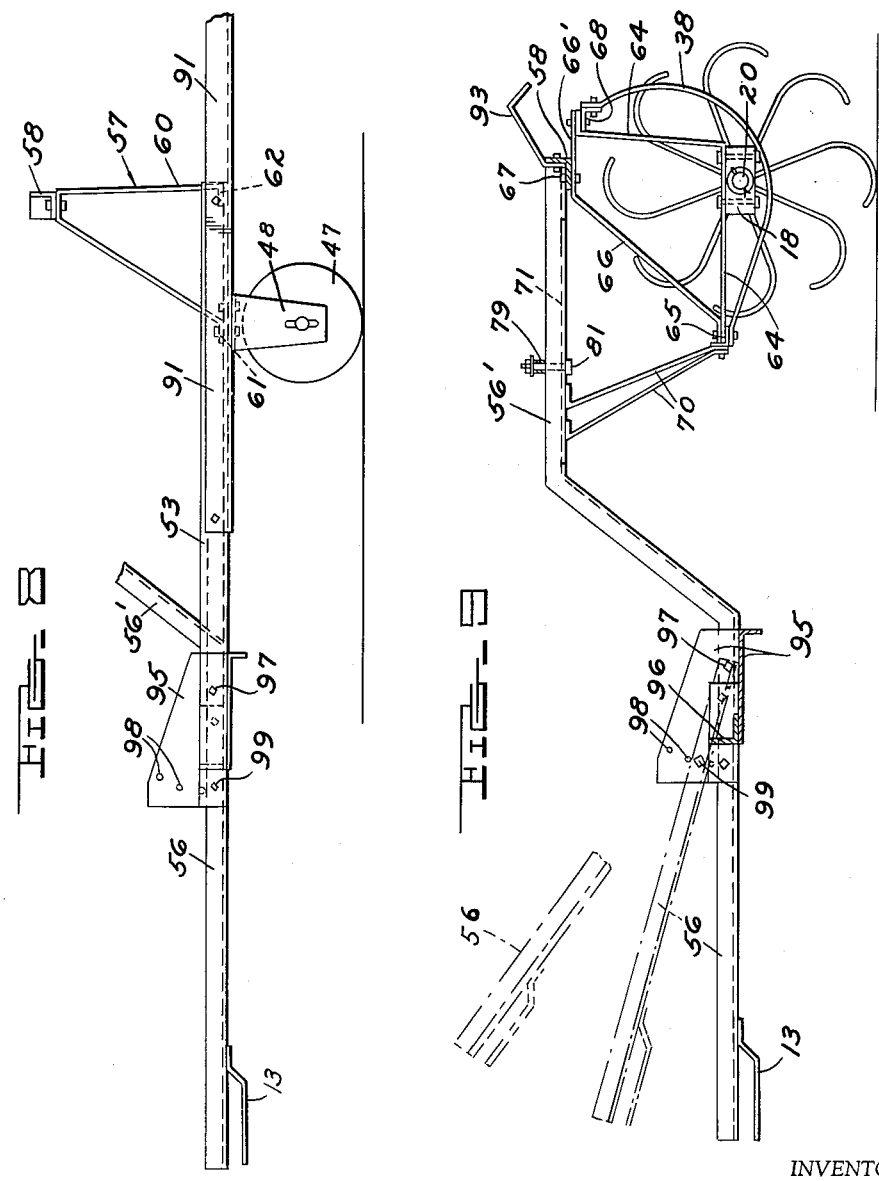

April 18, 1961     A. R. CUNNINGHAM     2,979,880
TEDDER AND WINDROW ATTACHMENT
Filed Oct. 25, 1957     7 Sheets-Sheet 7
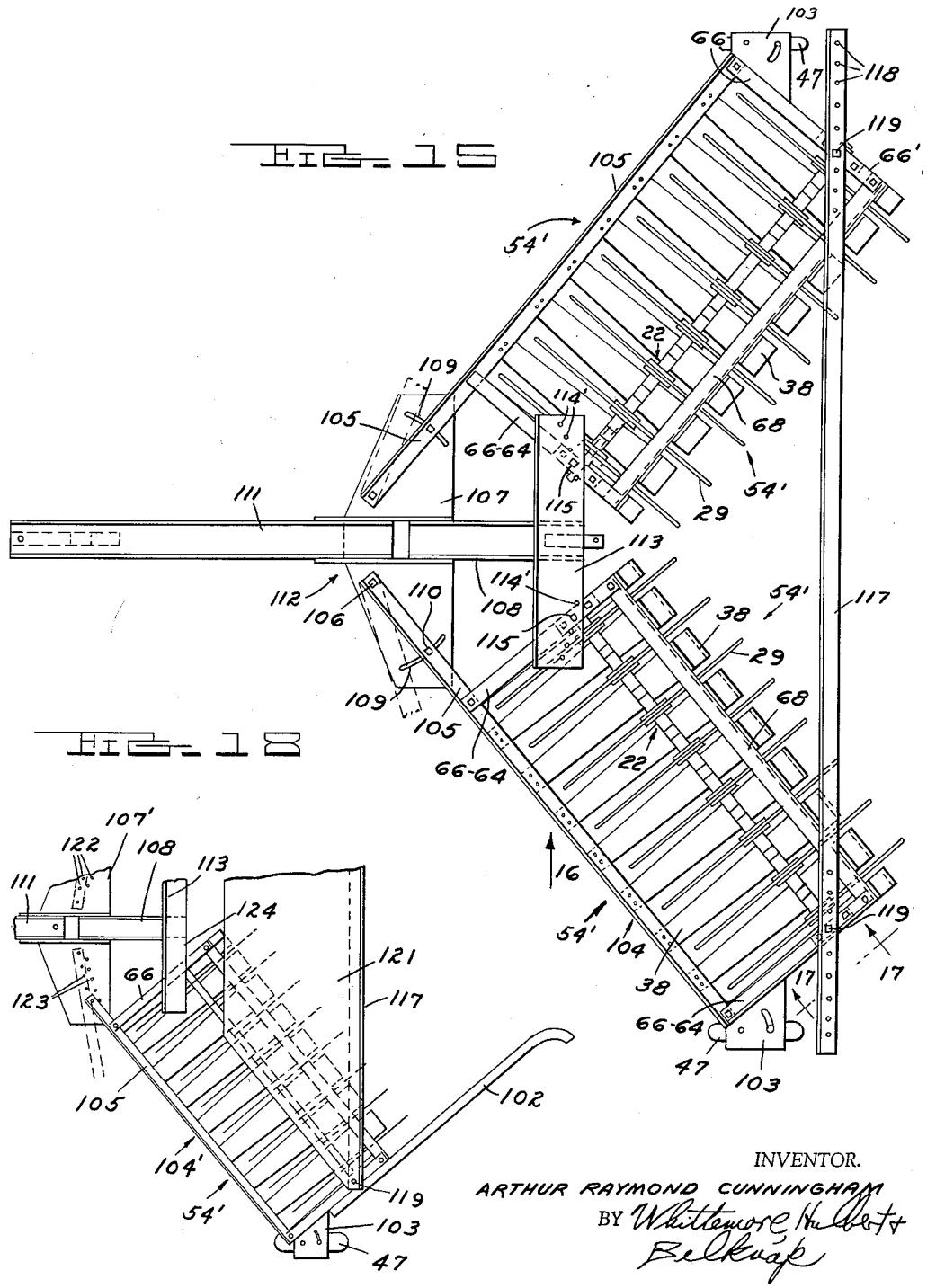
INVENTOR.
ARTHUR RAYMOND CUNNINGHAM
BY Whittemore Hulbert
Belknap
ATTORNEYS

United States Patent Office 2,979,880
Patented Apr. 18, 1961

2,979,880

TEDDER AND WINDROW ATTACHMENT

Arthur Raymond Cunningham, Chicago, Ill., assignor to Cunningham & Sons, Chicago, Ill., a partnership Filed Oct. 25, 1957, Ser. No. 692,346

10 Claims. (Cl. 56—372)

The present invention relates to an improved tedder and windrow attachment for assisting the drying and curing of hay and other grasses. In particular, the invention deals with a tedder unit of great simplicity and low cost of production, capable of being employed with improved effect in a simple tedding operation or as a windrowing device, in each instance either alone or in association as a combine or gang with another similar unit.

It is an object of the invention to provide an improved tedder, or tedder type windrowing unit, featuring a set of curved tines of spring metal arranged in a longitudinal series and driven solely by ground engagement, or by the traction exerted solely by the hay or other material tedded, as distinguished from previous, relatively expensive tedding devices in which the tines are rotated by a positive driving unit of one type or another.

Another object is to provide a device of the above sort, featuring provisions whereby the tedding tines to be driven by ground traction, as when the hay is wet and/or packed down in the stubble after a rain, or for elevating the tines somewhat in the event the hay is relatively loose and dry, in the form of adjustable ground engaging wheels maintaining a desired elevation of the tines, which wheels are also employed in the road or field travel of the attachment to and from the area in question.

In any of the foregoing arrangements, it is an object to provide a tedder which actively stirs up, ruffles and flips over the cut hay or grass, rather than merely agitating it, and thus assists in a quick and thorough drying of the grass.

Yet another object is to provide a tedder of this sort characterized by a plurality of tedding tines of curved spring metal construction arranged in a longitudinal series transversely of the path of advance of the unit, in which the space between these tines is occupied by curved guard elements acting to strip the hay from the tines as it is being flipped by the latter, and thereby increasing the efficiency of the unit.

A still further object is to provide a tedding unit as described, in which the tedding tines are journaled on a transverse shaft by improved stamped hub members serving to maintain the proper axial spacing of the tines relative to one another, these hub members enabling the tedder unit to be produced at a minimum cost. Servicing and replacement of the tine units are also greatly facilitated.

Yet another object is to provide a combine type of tedding apparatus, in which like tedder units of the type described may be easily and quickly assembled, on field locations, in various types of tedding and/or windrowing arrangement.

The foregoing, as well as other objects, become more apparent as this description proceeds, especially when considered in connection with the accompanying drawings illustrating preferred embodiments of the invention, wherein:

Fig. 1 is a top plan view, partially broken and in axial section, of a basic tedder unit in accordance with the invention;

Fig. 2 is a view in rear elevation of the basic tedder, as equipped with ground wheels;

Fig. 3 is a view in side or end elevation of the same tedder;

Fig. 4 is a somewhat schematic view in longitudinal vertical section on a line corresponding to line 4—4 of Fig. 1, illustrating the tedding operation performed by the improved unit, but with the ground wheels removed and the tedding tines riding the ground;

Fig. 5 is a fragmentary enlarged view, in section on line 5—5 of Fig. 6, showing tine-mounting hub subassembly as applied to a transverse journaling shaft of the tedder;

Fig. 6 is a fragmentary view in vertical section along the line 6—6 of Fig. 5;

Fig. 7 is a top plan view showing a proposed assembly of like tedding units on a draft frame to accomplish a combined tedding and windrowing operation;

Fig. 7A is a fragmentary plan view of the tedderwindrower assembly of Fig. 7, as modified by the addition of a top plate or cover over the windrower section or unit to prevent snagging or catching of the hay with a frame part of the assembly;

Fig. 7B is an end elevation of the plate, cover or shield of Fig. 7A, as from the line 7B—7B of that figure;

Fig. 7C is a top plan view showing the assembly of Fig. 7 (or Fig. 7D) as modified by the addition of a rear deflector plate to assist in windrowing;

Fig. 7D is a fragmentary plan view similar to Fig. 7, but showing a similar assembly as combined in a somewhat different fashion, ground wheels being omitted for simplicity;

Fig. 8 is a fragmentary end view, as from the direction of arrow 8 of Fig. 7, of the draft frame of the combined unit of that figure;

Fig. 9 is a vertical section on line 9—9 of Fig. 7, an adjusted position of a draft or coupling tongue of the unit being shown in dot-dash line;

Fig. 10 is a fragmentary view, in enlarged scale, in vertical section along line 10—10 of Fig. 7;

Fig. 11 is a fragmentary top plan view showing a detail of an adjustable mount for a tedder unit of the assembly shown in Fig. 7, being an enlargement of the zone "A" of that figure;

Fig. 12 is a fragmentary view in vertical section on line 12—12 of Fig. 11;

Fig. 13 is a further fragmentary view in top plan of a mounting detail of the assembly of Fig. 7, being an enlargement of the zone "B" of that figure;

Fig. 14 is a fragmentary view in vertical section along line 14—14 of Fig. 13;

Fig. 15 is a top plan view of a further tedding and windrowing assembly in accordance with the principle of the invention;

Fig. 16 is a view of the draft frame of the assembly of Fig. 15, as from the line 16 of Fig. 15, with an adjusted position of the draft tongue of the assembly illustrated in dot-dash line of Fig. 16;

Fig. 17 is an end elevational view, as from line 17—17 of Fig. 15, of frame and tine components of the assembly of that figure; and Fig. 18 is a fragmentary top plan view of a tedder type windrowing combine, generally similar to that of Figs. 15–17, but incorporating modified features.

A basic tedder unit in accordance with the invention is illustrated in Figs. 1, 2 and 3 of the drawings, being generally designated by the reference numeral 10. This unit includes a rugged draft frame 11 of angle iron construction, made up of a central draft tongue member 12 adapted to be releasably coupled at its forward end to a tractor or like draft vehicle, as by the forked coupling yoke 13. The tongue 12 may be in the form of an elongated, upwardly opening channel section which has bolted thereto, intermediate its length, a pair of rearwardly divergent angle iron arms 14. The rear portions of the divergent arms 14 are angled at 15 to provide extensions parallel to the direction of intended advance of the device, the extensions terminating somewhat behind the central tongue member 12.

An elongated transverse angle iron brace 16 is bolted across the forward part of the extensions 15 and the tongue member 12, forwardly of its rear end, thus to constitute the draft yoke or frame 11 as a rigid, rugged unit, yet very inexpensive in production cost.

Just forwardly of their rear ends, each of the yoke extensions 15 and draft tongue 12 is provided with a pillow block type of shaft mount 18, secured thereto by bolts or studs 19, and an elongated transverse tine shaft 20 is mounted in these three transversely spaced blocks, which are inexpensively fabricated of wood, for free rotation therein.

The reference numeral 22 (Figs. 1, 2, 3, 5 and 6) generally designates a tine unit or sub-assembly of the tedder 10, of which there are a considerable number uniformly spaced along the length of the shaft 20 (Figs. 1 and 2).

Referring to Figs. 5 and 6, each tine unit 22 comprises an elongated cylindrical sleeve or hub element 23, which may be fabricated of a length of inexpensive piping, having mounted thereon a plate device for mounting the tines, in the form of a pair of like, sheet metal tine mounting disks constituted by stampings 24 of circular outline, centrally apertured to receive the hub 23. Each stamping 24 is formed to provide an annular embossed groove 25 surrounding the central aperture thereof, and one of the stampings or disks is welded to the hub at this zone. Radial embossed groove formations 26, spaced in equal angular succession, extend outwardly from the groove 25 through the periphery of the stampings. Stampings or disks 24 are provided with registering bolt holes 27 between successive radial grooves 26; and bolts 28 applied to these holes secure the stampings together to constitute a unitary assembly with the hub 23 and tines, to be described.

The tines, designated 29, are of spring steel, circular in cross section, and are clamped between the axially aligned and registered mounting stampings 24, as illustrated in Figs. 5 and 6. In order to effect a rigid displacement resisting mount each tine has an angularly offset inner anchoring finger 30 on the inner end of its shank 31, and the contour matching of the radial and annular groove embossments 25, 26 is such as to snugly receive and nest the inner end of the shank and its adjoining offset 30.

Thus, the bolts 28 firmly hold the tines clamped in a way to prevent loosening in use. There may be a slight axial spacing between inner flat surfaces of the respective stampings 24 when the bolts 28 are applied and taken up, in order to eliminate any possible looseness which might be expected in a stamped structure of this sort.

The shank 31 of each tine extends radially outwardly a substantial length (Figs. 3 and 4) and is then curved in an approximately quarter-circular outline at its terminus 34, in the direction opposite that toward which the tine rotates in passing beneath the shaft 20, i.e., as it receives field traction.

The shaft 20 is held against axial movement in the draft yoke or frame 11, as by cotter pins 35 applied outwardly of the end pillow blocks 18, and it is seen that the hubs 23 of the tine units 22 maintain the tines 29 in equal axial spacing. The hubs rotate freely on the shaft 20, which also rotates freely in the pillow blocks 18, so that it is seen that unfailing rotation of the tine units 22 under ground traction is assured.

In order to improve the efficiency of the tedding operation, by stripping the hay from the tines 29 as it is first picked up from a mowed swath 36 (Fig. 4) (the tine assembly rolling forwardly in the direction of the straight horizontal arrow), then flipped over or ruffled and deposited on the stubble of the ground in a loose overturned and agitated condition, as indicated at 37, it is desirable to provide stripping plates or guards 38 between each of the successive tine units 22.

To this end, upright strap iron rear braces 40 are bolted to each of the three pillow blocks 18, and further rearwardly and upwardly inclined braces 41 are bolted to the transverse frame angle iron 16, the respective braces 40, 41 of the three sets being in the respective vertical planes of the center draft tongue 12 and the end frame extensions 15. These braces are bolted at their rearward ends to a transversely extending, upper angle iron brace 42, thus constituting a very rigidly braced superstructural support.

The guards 38 are of curved sheet metal, being bolted along the length of the cross brace member 42 between the successive tine units 22, from which cross brace they extend downwardly and curve forwardly underneath the shaft 20 and tine hubs 23. The forward ends of the guards 38 are brought up and bolted along the length of the forward angle iron cross member or frame brace 16.

Referring to Figs. 1 and 3 of the drawings, it will be noted that the extensions 15 of the end frame angle irons 14 project substantially rearwardly at 15' beyond the guard supporting cross brace 42, where they are provided with a plurality of holes 45 for the attachment of a windrow unit to the tedder.

As indicated above, it may be desired to operate the tedder 10 with its longitudinal series of tedding tine units 22 rolling directly on the ground. This may be advisable if the hay is packed down into the stubble, as after a rain, with the tines walking along the ground to pick up and ruffle the compacted damp swath as the tedder 10 is advanced.

In the alternative, and certainly for the purpose of road and general field transport of the tedder, it is desirable to be able to equip the same with load supporting tires or wheels 47, as shown in Figs. 1, 2 and 3. To this end, a rigid sheet metal fork or bracket 48 of inverted U-shape is bolted to the under side of each of the end pillow blocks 18, and each bracket is provided adjacent the lower end thereof with a plurality of mounting holes 49, by the selective use of which the wheel 47 may be adjustably mounted at a desired elevation relative to the tines 22 and the frame 11, as by selectively bolting hub flanges of the wheel 47 (not shown) to different sets of holes of the bracket 48. The bolted mount of the forks or brackets 48 to the pillow blocks 18 is a removable one, in order to permit the optional use or non-use of the ground wheels.

In the event it is desired to assemble two or more of the tedders 10 in direct end-to-end relation and pull them by a single draft vehicle, the side yoke extensions 15 are each provided with a hole 50 adjacent their merger with the rearwardly diverging arms 14, for the purpose of receiving a coupling bolt or the like.

The action of the tedder 10 as shown in Fig. 4 differs from that of previous units for the same purpose in that the hay or other mowed grass is not merely agitated or disturbed as it lays on the stubble of a mowed swath, but is actually lifted and then bodily flipped or ruffled by the curved outer tine ends 34; and this is done without any comparatively expensive provision for powering the tines. They are rotatively driven by the tractive effect of the ground or mowed hay or stubble as the advancing unit either walks along the ground surface or is engaged by the hay or grass while riding on ground wheels 47, to impart field traction.

The unit 10 is one which may be readily assembled on location, and just as readily taken apart, if necessary, in the event of damage requiring replacement or repair of any component part, or in the event it is desired to change the character of a coupled combine assembly of such units.

The tine mounting hub arrangement of Fig. 5 is an inexpensive one, yet the individual tines are gripped and firmly held against wracking twist from their proper parallel alignment, and in proper axial spacing. Here again, the provisions are such that one of the circular stampings 24 and its welded hub or mounting sleeve 23 may be readily dismantled from the other bolted stamping in the event it is desired to replace a damaged tine.

Figs. 7 and 7D of the drawings show alternative combinations of tedder units (to be described) with one another to constitute a combine assembly, generally designated 52, by which combined tedding and windrowing of swaths may be accomplished.

In an installation of this sort, a special type of draft frame, generally designated 53 and equipped with rear extensions 53', is employed, which permits the mounting and adjustment thereon of individual like tedder units or sections 54, 54' (very similar to but smaller than the basic unit 10), with an auxiliary miniature tedder section 55 employed optionally, in accordance with the particular type of adjustment or setting of the two similar sections 54, 54'. Figs. 7 and 7D, in which auxiliary tedder section 55 occupies the zone Z of Fig. 7 and Z' of Fig. 7D, show such optional adjustments to permit simple tedding of a swath by the locked together sections 54, 55, while the section 54' performs a combined operation of tedding and windrowing a swath, as in Fig. 7; while in Fig. 7D an arrangement is shown in which the auxiliary tedding section 55 is a simple tedder and the section 54' also windrows, as does another angularly mounted similar section, like section 54, on the opposite side of section 55.

It will be noted in Figs. 7-9 that the central draft tongue 56 of yoke or frame 53 has an elevated rear extension 56' for a purpose to be described. For coaction with this extension, each of the yoke frame extensions 53' carries an adapter type of superstructure, generally designated 57, the extensions and adapter being rigidly coupled or yoked by an elongated angle iron cross brace 58 of special construction, to be described.

Each of the tedder sections 54, 54' and 55 is constructed in an arrangement of its tine units 22, guards 38, etc., such as is illustrated and heretofore described in connection with Figs. 1 through 6 of the drawings, the sections differing primarily only as to size. Accordingly, corresponding numerals are employed to designate corresponding parts and further description is dispensed with.

As illustrated in Fig. 8, the bracing superstructure members 57 applied to the rear extensions 53' at the opposite ends of the respective frame arms 53 may comprise the specially formed upright brackets 60 of inverted, generally U-shaped outline, bolted at 61, 62 to the respective rear extensions. The cross brace 58 is bolted to the tops of these brackets as well as, as indicated above, to the rear extension 56' of the draft tongue 56.

The support bracing structure for the respective tedder sections 54, 54' and 55 is illustrated in Fig. 9. Each of these sections is provided, at opposite ends thereof, with an L-shaped mounting strap iron 64, the horizontal arm of which is bolted to the shaft pillow block 18 and extends forwardly, where it is bolted to an angle iron cross brace 65, to which the forward end of the tine guards 38 of the respective sections 54, 54' and 55 are also secured. A rearwardly and upwardly inclined further brace 66 of strap metal is bolted to the cross member 65, being bolted at its upper portion to the thru-cross brace 58 at 67; and the strap brace 66 for rear extensions 66' to which the upright arm of the L-shaped strap is bolted.

Each of the respective sections 54, 54' and 55 has an individual rear angle iron 68 serving as a rear cross brace, to which member the rear and upper ends of the tine guards 38 are bolted.

Forwardly and upwardly angled additional brace members 70 extend from the cross brace 65 of a fixedly mounted tedder section, such as the section 55, to the draft tongue extension 56', and this extension is provided with a longitudinally extending slot 71 in its horizontal web for a purpose to be described.

In order to constitute the tedder sections 54, 55 a single unit, in effect, they may be yoked together by a length of strap metal 73, as by bolting or otherwise along the forward cross braces 65 of the respective sections.

As indicated in Fig. 7, it is contemplated that at least one of the tedders 54, 54' shall be mounted for swinging adjustment about a forward outer corner connection, as at "B" in Fig. 7. To this end, the outer extremity of the forward cross brace 65 of the tedder sections, for example, the section 54', is pivoted as by a bolt 74 to the adjacent frame arm 53, just forwardly of its rear extension 53'. As indicated above, the rear thru-cross brace 58 is of special construction, that is, it is provided with horizontally disposed, forward plate-like enlargements 75 adjacent its ends which are secured to the superstructure members 57; and the enlargements 75 carry forwardly and inwardly curved slots 76. Guide bolts 77 extending through the horizontal portions of inclined braces 66 are received in the respective slots 76, and may be taken up when the tedder section 54' is positioned at proper angularity to brace it in that position.

A further brace of the character illustrated in Figs. 7, 11 and 12 is provided for the opposite end of the tedder section 54', as at the zone "A," for connection with the slotted draft tongue rear extension 56'. This brace takes the form of a link 79 having an elongated slot 80 almost coextensive therewith, a bolt 81 extending through this slot and the adjacent top portion of the angled brace 66 of the tedder section, with a spacer sleeve 81' interposed, which bolt may be tightened when the section is properly positioned. Link 79 extends across the elevated rear extension 56' of the draft tongue 56, where its slot receives a further bolt 82 extending through the slot 71 of the tongue extension, and adapted to be tightened to constitute a rigid bracing coupling.

A third brace provision for the tedder-windrow section 54' is illustrated in Figs. 7 and 10 of the drawings. Here the forward cross brace 65, to which the inclined brace 66 and tine guards 38 are secured, has a bracing support in the form of a slotted link 84 articuated thereto by an upright locking bolt 85, with a suitable spacer 86 interposed. The brace 84 extends forwardly, where it is similarly connected by a bolt 87 with the frame arm 53. When the bolts 85, 87 are taken up a rigid bracing of the tedder-windrow section 54' is completed at four different points.

As illustrated in Fig. 7, the rear extension 53' of the frame 52 may be provided with a series of bolt-receiving apertures 89 for the adjustable positioning of the bracket 48 which mounts the ground wheel 47.

A separate extension 91 may be suitably secured on the frame or yoke arms 53, braced by a strap 92 to the thru-cross brace 58, in the event it is desired to hook on another similar tedding unit for a combined operation.

Further, as illustrated in Fig. 9, a special angled connector 93 may be applied to the thru-cross brace 58 at the center thereof, in alignment with the draft tongue 56, for the purpose of ganging up an additional rearwardly disposed tedder or tedder-windrow unit for a combine operation. In such event, assuming the unit to be one such as is depicted in Fig. 7, its draft tongue 56 will be elevated to the dot-dash line position of Fig. 9 for coupling with the member 93 in question. In such event, a U-shaped adapter member 95 may be welded or otherwise secured to the forward extremity of the draft tongue extension 56', being braced by a cross iron 96, and the draft tongue proper 56 may be pivoted at 97 on this adapter. The latter is furnished with a series of arcuately arranged openings 98 to receive the cross bolt 99 and thereby hold tongue 56 in its adjusted position.

In the installation of Fig. 7, the tedder-windrow unit or section 54' is shown in a forwardly disposed relation to the coupled tedder sections 54, 55. Fig. 7D shows an alternative arrangement, in which the tedder-windrow section 54' is similarly mounted, but in which the tedding section 55 (as well as an associated tedding and windrowing section 54, not shown) are also disposed forwardly. As shown in Fig. 7D, in which parts corresponding to those of Fig. 7 are designated by corresponding numerals, the center, auxiliary section 55 is shifted forwardly and somewhat laterally of its position in Fig. 7, to bring its rear cross brace 68 next to the adjacent end of the corresponding rear brace 68 of the section 54'. The tongue engaging brace link 79 for section 54 may be omitted, the latter relying for its support by the connections at bolts 74, 77, and bracing link 84. A shift and anchoring of the tedder section 54 (not shown), similar to that of section 54', will then bring it into the same angular relation to section 55 as the section 54'. In this disposition, the tedding section 55 may be secured to the rear tongue extension 56' by bolts 100 engaging the slot 71 of the extension. In other respects, structural features of the embodiments of Figs. 7 and 7D, including the composition of their tine units 22 and the relative disposition of these units in the respective tedder sections 54, 54' and 55, are similar.

Figs. 7A and 7B show an additional feature of improvement for incorporation in the tedder-windrower assembly 52 of either Fig. 7 or 7D. In accordance with this improvement, a top cover, plate or shield 101, marginally braced by angle irons and of generally triangular outline, is provided to overlie a major portion of the windrowing section 54'. The plate 101 is provided with an arcuate series of holes 101' adjacent a side thereof paralleling the rear tongue extension 56', which holes selectively receive a bolt 101'' to connect the plate 101 to the slotted link 79, and thus support the plate in this zone. A further bolt or bolts 101''' is employed to secure the plate 101 to the thru-cross iron 58 of the frame.

The sheet metal shield 101 prevents the hay from catching on the rear cross angle iron 58, when the unit 54' is set up for a windrowing operation.

Fig. 7C shows another optional improvement, applicable either to the combine assemblies of Figs. 7 and 7D, or to a further type of combine assembly shown in Figs. 15 and 18, to assist in windrowing. As modified in accordance with this improvement, the windrowing tedder section 54' has a rectangular sheet metal side shield or diverter 102 fixedly but removably applied to its mounting bracket 64, 66 in any appropriate fashion. The shield 102 is rigidly braced, as by angle irons 102' across its top and bottom, and it terminates in an outturned rear extremity 102''. The top of the shield is at approximately the elevation of the top of the tedder tine unit 22, and its bottom is disposed at an elevation somewhat above the bottom of the tine unit.

Appropriate provisions are made to adjust the windrowing shield 102, to enable it to deflect the hay into a windrow as desired. It may be secured to the frame bracket structure 64, 66 by the use of appropriate bolts which hook over portions of this structure to removably hold the deflector in place.

Figs. 15, 16 and 17 show another adaptation of the principles of the invention, for a dual tedding-windrowing operation. Here, end wheel brackets 103 of the character shown are employed to swivel the opposite ground wheels 47, and the draft frame 104 to which these brackets are secured is constituted by a pair of divergent angle irons 105. These are forwardly pivoted at 106 on a forward horizontal wing plate or member 107, and a draft tongue rear extension 108 is fixed centrally on the member 107.

Arcuate slots 109 in the wing member 107 receive take up bolts 110 by which the respective tedding sections, designated 54' since they are the same as in Figs. 7-14, may be locked in desired angular position. The draft tongue proper, 111, may be fixed or pivoted for vertical swinging movement on the wing member 107, as by provisions 112 generally similar to those of Fig. 9.

The bracket iron straps 64, 66 mounting the tedder units 54' are bolted directly to the respective frame arms 105, rather than to a forward cross brace 65, as in Figs. 7-14, but otherwise the tedder mount is the same, hence corresponding reference numerals are employed.

In order to lock up the tedder-windrow units, the draft tongue extension 108 carries a further rear wing plate 113 having a series of arcuately arranged holes 114 to selectively receive bolts 115, which engage through an intermediate hole in the horizontal arm of the L-shaped bracket strap 64, or may engage the adjacent pillow block 18.

Tedder units 54' are braced adjacent their rear by an elongated angle iron 117 having a series of holes 118 adjacent its ends, through which bolts 119 are selectively engaged with the top of the bracing bracket straps 66.

Fig. 18 represents an alternative form of the combine set-up illustrated in Figs. 15 and 16, employing a pair of tedder-windrower sections 54' similar to those previously described, and disposed in a forwardly convergent angular relation, in the general manner of Fig. 15.

In this embodiment, a top sheet metal cover plate 121 is employed to keep the hay from catching on a rear cross angle iron 117 similar to that of Fig. 15. However, it will be observed that the cross iron 117 is in this instance disposed with its vertical flange to the rear, so as to allow the sheet metal shield 121 to abut this flange and rest on its horizontal flange. The shield 121 extends transversely to cover the rear portions of both of the tedder-windrower sections 54.

Reference numerals similar to those applied in Fig. 15 are employed in Fig. 18 to designate corresponding parts of the units, which are supported on a draft frame 104' including adjustable divergent yoke arms 105, in the fashion of Fig. 15.

An alternative type of adjustment of the units 54', to regulate their angular relation, is employed in Fig. 18. To this end, the draft tongue 111 carries a transverse wing plate or member 107' generally similar to that of Fig. 15, and this member carries two series of adjustment holes 122, 123 arranged in arcuate succession, the respective series being forwardly convex in outline and being spaced in front to rear relation to one another.

The wing plate 113 on the rear draft tongue extension 108 is equipped with a forwardly concave further arcuate series of adjustment holes 114'; and the divergent arm angle irons 105 have holes therein which are selectively bolted to any of the holes 122, 123 of the two forward wing plate series. Similarly, the mounting bracket structures 64, 66 may be adjustably bolted in the holes 124 of the rearmost wing plate series. These arrangements permit a wide choice of adjustment of the respective tedder-windrower units 54' on location.

What I claim as my invention is:

1. Tedding apparatus comprising a longitudinally movable draft frame and a tedder assembly mounted on said frame, said tedder assembly having a shaft disposed transversely of the central longitudinal axis of said frame and having a plurality of tines distributed along the length of said shaft, said tines being rotatable about the axis of said shaft in an upward and rearward arc during forward movement of the apparatus, each tine having a shank projecting radially outwardly from said shaft and having at the outer end of said shank a terminal portion extending from said shank in a direction opposite the direction of intended rotation in an arc of approximately 90°.

2. The tedding apparatus defined in claim 1 in which said tines are drivingly independent of said frame for rotation by field traction.

3. The tedding apparatus defined in claim 1 having guards on said frame spaced apart axially of said shaft in positions to extend between said tines at the rear of said shaft, said guards serving to strip cuttings from said tines.

4. The tedding apparatus defined in claim 1 in which said shaft is disposed at right angles to the central longitudinal axis of said frame.

5. The tedding apparatus defined in claim 1 in which said shaft is disposed at an acute angle to the central longitudinal axis of said frame.

6. The tedding apparatus defined in claim 5 in which a plate-like top shield is carried by said frame in position to overlie at least a portion of said tines.

7. The tedding apparatus defined in claim 5 in which a generally upright deflecting shield is carried by said frame at the rearmost end of said shaft and disposed at right angles to said shaft to assist in forming a windrow.

8. The tedding apparatus defined in claim 1 in which said shaft is composed of separate independent sections on either side of the central longitudinal axis of said frame with their axes disposed at an acute angle to the central longitudinal axis with the adjacent inner ends thereof forwardly of the outer ends.

9. The tedding apparatus defined in claim 1 in which said shaft is composed of separate independent sections on either side of the central longitudinal axis of said frame, and means are provided for mounting said shaft sections on said frame in selected positions of adjustment including a position of alignment in which the axes of said shaft sections extend at right angles to said central longitudinal axis and a position in which the axes of said shaft sections are disposed at an acute angle to said central longitudinal axis with the adjacent inner ends thereof forwardly of the outer ends.

10. Tedding apparatus comprising a longitudinally movable draft frame and a tedder assembly mounted on said frame, said tedder assembly having a shaft disposed transversely of the central longitudinal axis of said frame and having a plurality of tines distributed along the length of said shaft, said tines being rotatable about the axis of said shaft in an upward and rearward arc during forward movement of the apparatus, each tine having a shank projecting radially outwardly from said shaft and having at the outer end of said shank a terminal portion extending from said shank in a direction opposite the direction of intended rotation at an angle of approximately 90°.

References Cited in the file of this patent

UNITED STATES PATENTS

| | | |
|---|---|---|
| 349,928 | Denney | Sept. 28, 1886 |
| 383,872 | Earnest | June 5, 1888 |
| 536,404 | Teicher | Mar. 26, 1895 |
| 557,417 | Nelson | Mar. 31, 1896 |
| 2,451,402 | Meyers | Oct. 12, 1948 |
| 2,718,746 | Prischmann | Sept. 27, 1955 |
| 2,851,846 | Van der Lely et al. | Sept. 16, 1958 |
| 2,867,965 | Goodall et al. | Jan. 13, 1959 |

FOREIGN PATENTS

| | | |
|---|---|---|
| 386,965 | Germany | Dec. 20, 1923 |
| 620,467 | France | Feb. 12, 1932 |